(12) United States Patent
Kagawa et al.

(10) Patent No.: US 9,096,013 B2
(45) Date of Patent: Aug. 4, 2015

(54) APPARATUS FOR FORMING SLANT, LINEAR EASY-TO-TEAR PORTIONS ON LONG PLASTIC FILM

(75) Inventors: Seiji Kagawa, Koshigaya (JP); Yoichiro Kagawa, Koshigaya (JP)

(73) Assignee: SEIJI KAGAWA, Koshigaya-Shi (JP)

( * ) Notice: Subject to any disclaimer, the term of this patent is extended or adjusted under 35 U.S.C. 154(b) by 547 days.

(21) Appl. No.: 13/525,628

(22) Filed: Jun. 18, 2012

(65) Prior Publication Data
US 2013/0129852 A1 May 23, 2013

(30) Foreign Application Priority Data

Nov. 18, 2011 (JP) .................................. 2011-252845
Jun. 5, 2012 (JP) .................................. 2012-128160

(51) Int. Cl.
*B29C 59/04* (2006.01)
*B29C 59/00* (2006.01)

(52) U.S. Cl.
CPC .............. *B29C 59/04* (2013.01); *B29C 59/007* (2013.01)

(58) Field of Classification Search
CPC ............................. B29C 59/007; B29C 59/04
USPC ............ 425/335, 363; 83/331, 349, 509–511, 83/566, 570, 879, 880, 882; 225/2, 3, 46
See application file for complete search history.

(56) References Cited

U.S. PATENT DOCUMENTS

| | | | | |
|---|---|---|---|---|
| 4,680,083 A | * | 7/1987 | Kashiwaba | 156/510 |
| 5,654,082 A | * | 8/1997 | Kagawa | 428/212 |
| 7,938,998 B2 | * | 5/2011 | Kagawa et al. | 264/162 |

FOREIGN PATENT DOCUMENTS

JP 11-77872 A 3/1999

* cited by examiner

*Primary Examiner* — James Mackey
(74) *Attorney, Agent, or Firm* — Birch Stewart Kolasch & Birch, LLP

(57) ABSTRACT

An apparatus for forming slant, linear easy-to-tear portions on a long plastic film, comprising a roll on which the long plastic film passes, pluralities of pattern rolls each partially having a slant, linear stamp on a rolling surface, a shaft to which pluralities of the pattern rolls are fixed, and a first mechanism for moving the shaft in a direction to the roll. Pressure rolls pushing the pattern rolls via rolls fixed to the shaft. A second moving mechanism for moving the pressure rolls in a direction to the pattern rolls, whereby with the pressure rolls pushing the pattern rolls by the second moving mechanism, the stamp of the pattern rolls are pressed onto the elastic film by the first moving mechanism, so that the slant, linear easy-to-tear portions with recesses formed by the pattern projections of the stamp are provided partially and periodically on the plastic film.

11 Claims, 20 Drawing Sheets

APPARATUS FOR FORMING SLANT, LINEAR EASY-TO-TEAR PORTIONS ON LONG PLASTIC FILM

FIELD OF THE INVENTION

The present invention relates to an apparatus for efficiently forming slant, linear easy-to-tear portions on a long plastic film.

BACKGROUND OF THE INVENTION

Plastic packages required to have high gas tightness, heat resistance and strength, such as retort pouches, are formed by laminates constituted, for instance, by a film of resins having high heat resistance and high strength, such as polyethylene terephthalate, a highly gas-tight layer such as an aluminum foil, and a sealant layer of cast polypropylene etc. Retort pouches are heated by hot water or a microwave oven, and opened to take out their contents. However, because the pouches have high strength, it is sometimes difficult to open the pouches by hand even if notches are provided on their sides. Particularly as graying population increases people with insufficient grip, there are increasing numbers of people failing to open pouches with notches by hand, sometimes needing scissors.

JP 11-77872 A discloses a method for producing an easy-to-cut laminate film package, comprising irradiating a laminate film comprising a substrate film layer and a sealant layer as thick as ½ or more of the total thickness with laser beams from the sealant layer side, to make the sealant layer thinner, thereby forming a continuous or intermittent half-cut separating line. When a slant, half-cut separating line is formed on a retort pouch by this method, the slant, half-cut separating line should be formed after individual retort pouches are produced, resulting in poor efficiency.

Because stretched films tend to be torn along orientation directions, bags with openings in parallel to orientation directions are easily torn open with notches formed on sides adjacent to the openings. However, such method provides bags tearable only in parallel to openings. Because small openings are preferable in most drinks, fluid foods, etc., packages (bags) with slantly openable portions are desired.

OBJECT OF THE INVENTION

Accordingly, an object of the present invention is to provide an apparatus for forming slant, linear easy-to-tear portions on a long plastic film efficiently.

SUMMARY OF THE INVENTION

As a result of intensive research in view of the above object, the inventors have found that by (a) arranging pluralities of rotatable pattern rolls in a transverse direction of the plastic film, each pattern roll comprising a stamp means having pattern projections for forming easy-to-tear portions (half-cut portions) slantly to a rotation direction, and (b) simultaneously and rotatably pressing the pattern rolls to the plastic film moving on a hard roll, pluralities of slant, linear easy-to-tear portions can be formed periodically on the plastic film. The present invention has been completed based on such finding.

Thus, the apparatus of the present invention for forming slant, linear easy-to-tear portions on a long plastic film comprises (a) a hard roll on which the long plastic film passes, (b) pluralities of pattern rolls each partially having a slant, linear stamp means having pattern projections on a rolling surface, (c) a shaft to which pluralities of the pattern rolls are fixed, (d) a first moving mechanism for moving the shaft in a direction to the hard roll, (e) pressure rolls pushing the pattern rolls directly or indirectly via small-diameter rolls fixed to the shaft, and (f) a second moving mechanism for moving the pressure rolls in a direction to the pattern rolls, whereby with the pressure rolls pushing the pattern rolls directly or indirectly by the second moving mechanism, the stamp means of the pattern rolls are pressed onto the plastic film by the first moving mechanism, so that the slant, linear easy-to-tear portions with recesses formed by the pattern projections of the stamp means are provided partially and periodically on the plastic film.

Specifically, the first apparatus of the present invention comprises (a) a hard roll on which the long plastic film passes, (b) pluralities of pattern rolls each partially having a slant, linear stamp means having pattern projections on a rolling surface, (c) a shaft to which pluralities of the pattern rolls are fixed, (d) a first moving mechanism for moving the shaft in a direction to the hard roll, (e) pressure rolls each pushing each of the pattern rolls from behind, and (f) a second moving mechanism for moving the pressure rolls in a direction to the pattern rolls, whereby with the pressure rolls pushing the pattern rolls by the second moving mechanism, the stamp means of the pattern rolls are pressed onto the plastic film by the first moving mechanism, so that the slant, linear easy-to-tear portions with recesses formed by the pattern projections of the stamp means are provided partially and periodically on the plastic film.

The second apparatus of the present invention comprises (a) a hard roll on which the long plastic film passes, (b) pluralities of pattern rolls each partially having a slant, linear stamp means having pattern projections on a rolling surface, (c) a shaft to which pluralities of the pattern rolls are fixed, (d) a first moving mechanism for moving the shaft in a direction to the hard roll, (e) pluralities of rolls having a smaller diameter than that of the pattern rolls and fixed to the shaft, (f) pressure rolls each pushing each of the small-diameter rolls from behind, and (g) a second moving mechanism for moving the pressure rolls in a direction to the small-diameter rolls, whereby with the pressure rolls pushing the small-diameter rolls by the second moving mechanism, the stamp means of the pattern rolls are pressed onto the plastic film by the first moving mechanism, so that the slant, linear easy-to-tear portions with recesses formed by the pattern projections of the stamp means are provided partially and periodically on the plastic film.

The first moving mechanism preferably comprises first carriers rotatably supporting the shaft, and first guide rails extending perpendicularly to the axis of the hard roll, along which the first carriers are movable in a direction to the hard roll.

It is preferable that the first carriers are always pushed by a resilient member with a small force in a direction away from the hard roll, and that the pattern rolls or the small-diameter rolls are pushed by the pressure rolls to the plastic film against the force of the resilient member.

Each second moving mechanism preferably comprises a second carrier rotatably supporting each pressure roll, and a second guide rail extending perpendicularly to the axis of the hard roll, along which the second carrier is movable in a direction to the hard roll.

The transverse positions of the pattern rolls are adjustable along the shaft.

In the first apparatus, each of the second guide rails is preferably fixed to each table, which is movable along third guide rails extending in parallel to the axis of the hard roll, in a transverse direction of the plastic film, so that the transverse positions of the pressure rolls are adjustable depending on the transverse positions of the pattern rolls.

In the second apparatus, the second guide rails are preferably located at fixed positions, such that each of the pressure rolls comes into contact with the corresponding small-diameter roll.

In one example, the projections of the stamp means are constituted by a large number of hard particles having sharp corners and Mohs' hardness of 5 or more, both sides of the stamp means being defined by grooves on a rolling surface. In another example, the projections of the stamp means comprises a ridge slantly extending on the rolling surface, and one or more edges projecting from an upper surface of the ridge in parallel to the ridge. The edges may be periodically provided with notches.

The pressure rolls are preferably rubber rolls.

The shaft is preferably driven by a motor, such that the pattern rolls rotate at the same peripheral speed as that of the hard roll.

DESCRIPTION OF THE PREFERRED EMBODIMENTS

Figure 1:
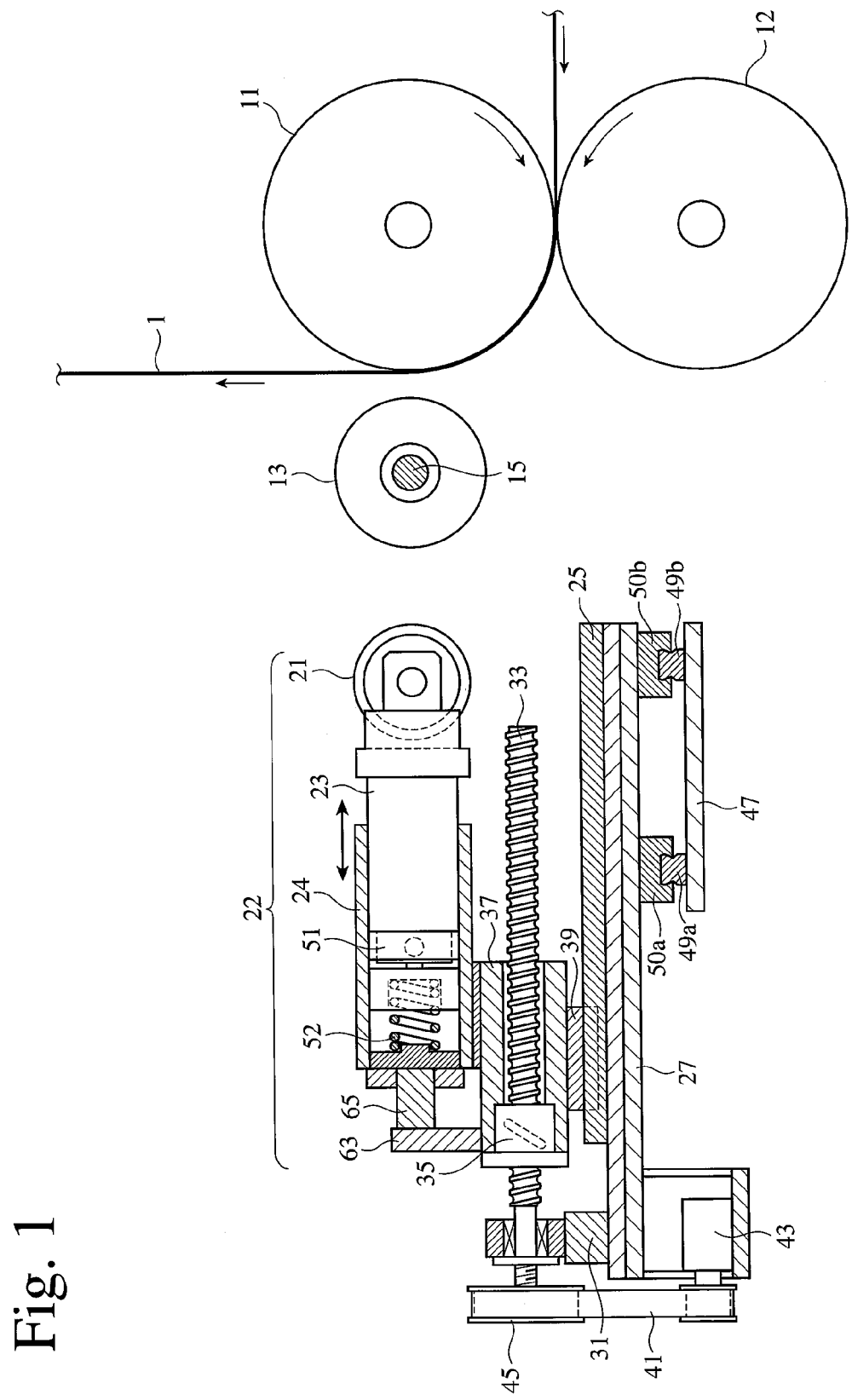
FIG. 1 is a partially cross-sectional side view showing the first apparatus of the present invention for forming easy-to-tear portions.

Embodiments of the present invention will be explained in detail below referring to the attached drawings, though the present invention is not restricted to them, and various modifications may be made within the scope of the present invention. The explanation of each embodiment is applicable to other embodiments unless otherwise mentioned.

The apparatus of the present invention for forming slant, linear easy-to-tear portions 100 on a long plastic film 1 comprises (a) a hard roll 11 on which a long plastic film 1 passes, (b) pluralities of pattern rolls 13 each partially having a slant, linear stamp means 13a having pattern projections on a rolling surface, (c) a shaft 15 to which pluralities of pattern rolls 13 are fixed, (d) a first moving mechanism for moving the shaft 15 in a direction to the hard roll 11, (e) pressure rolls 21 pushing the pattern rolls 13 directly or indirectly via small-diameter rolls 18 fixed to the shaft 15, and (f) a second moving mechanism for moving the pressure rolls 21 in a direction to the pattern rolls 13, whereby with the pressure rolls 21 pushing the pattern rolls 13 directly or indirectly by the second moving mechanism, the stamp means 13a of the pattern rolls 13 are pressed onto the plastic film 1 by the first moving mechanism, so that the slant, linear easy-to-tear portions 100 with recesses formed by the pattern projections of the stamp means 13a are provided partially and periodically on the plastic film 1.

[1] First Apparatus for Forming Easy-to-Tear Portions

Figure 2:
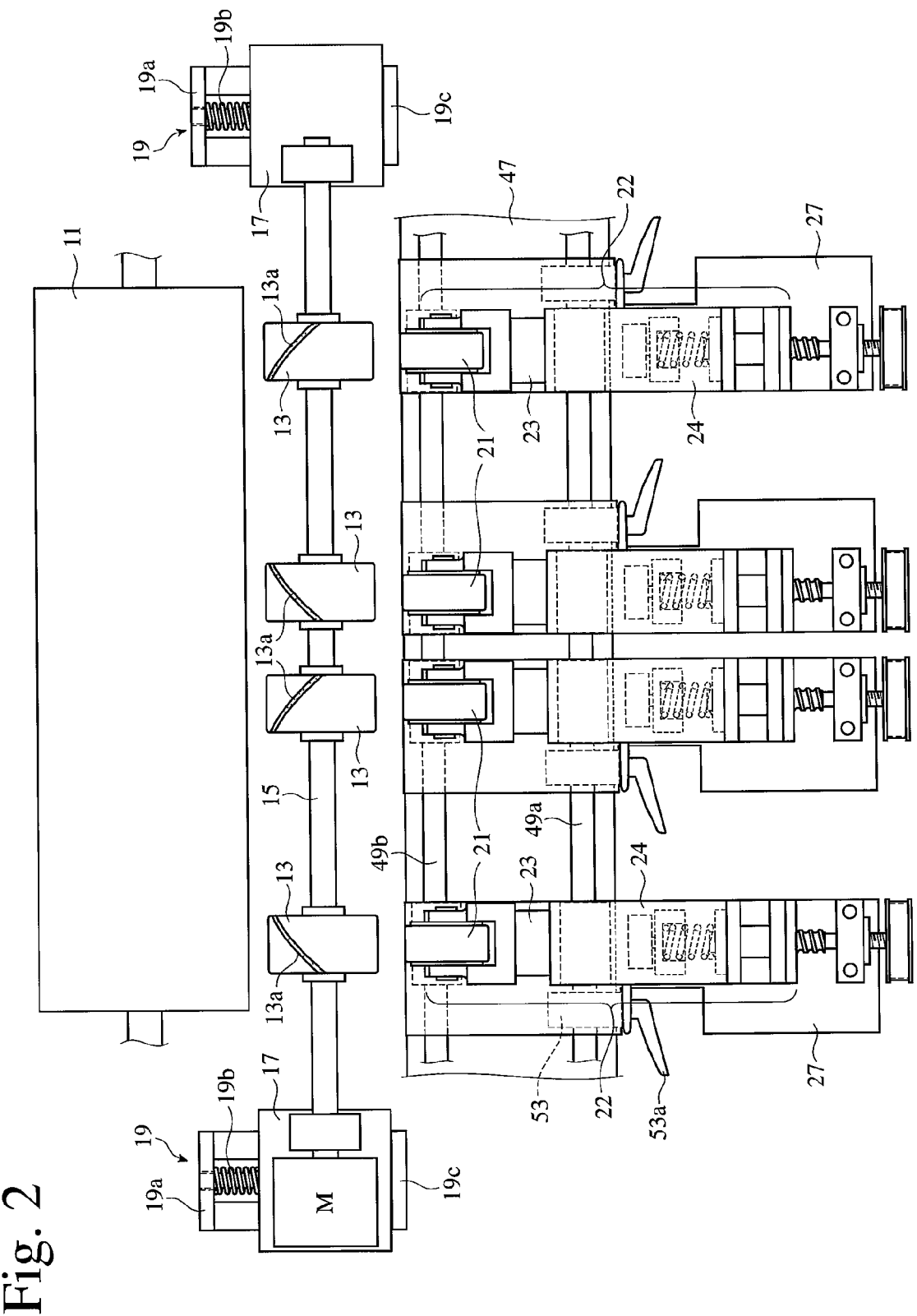
FIG. 2 is a plan view showing the first apparatus for forming easy-to-tear portions.
Figure 3:
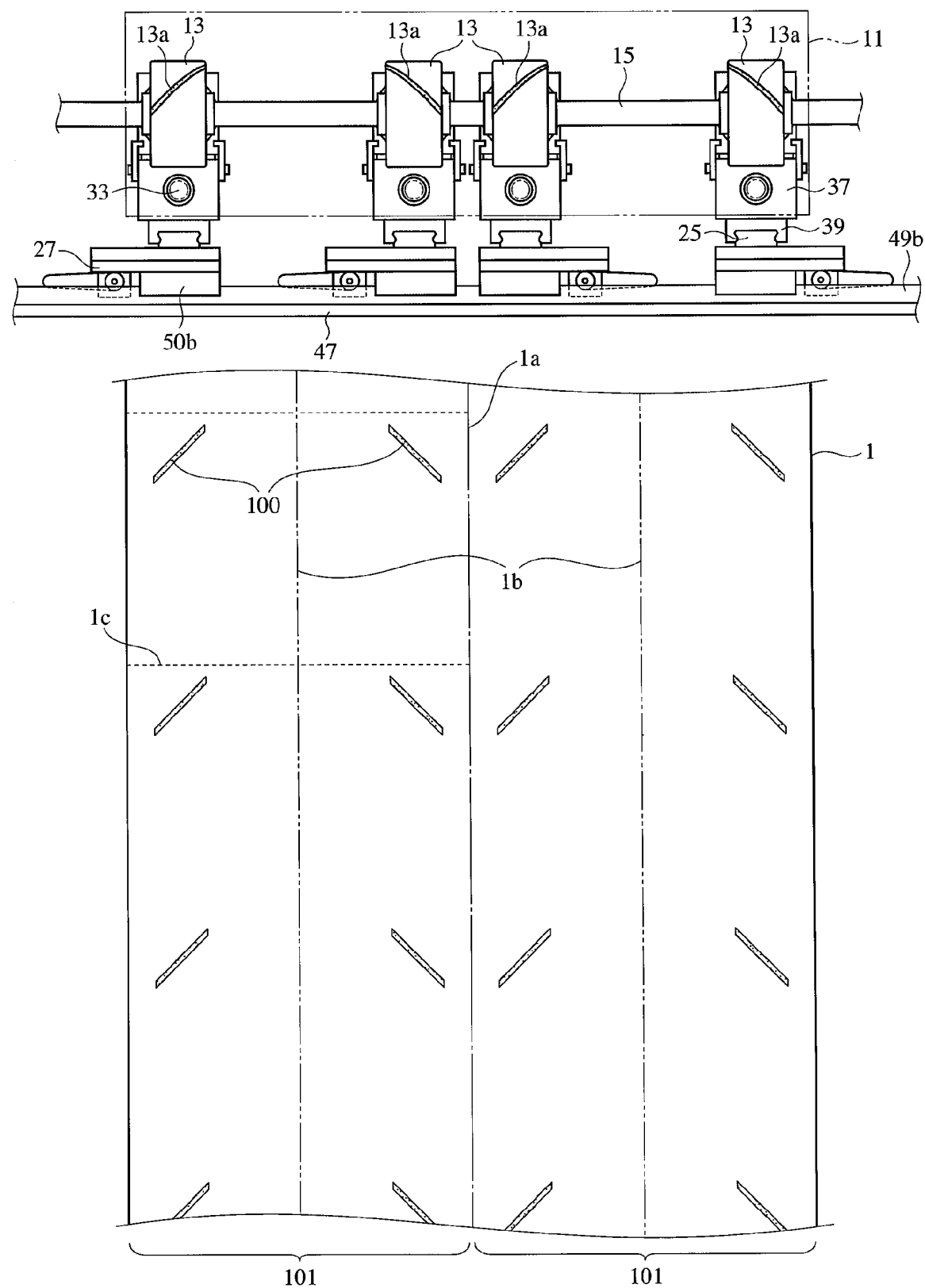
FIG. 3 is a front view showing the first apparatus for forming easy-to-tear portions together with a plastic film on which easy-to-tear portions are formed.

As shown in FIGS. 1-3, the first apparatus of the present invention for forming easy-to-tear portions comprises (a) a hard roll 11 on which a long plastic film 1 passes, (b) pluralities of (4 in the depicted example) pattern rolls 13 each partially having a slant, linear stamp means 13a having pattern projections on a rolling surface, (c) a shaft 15 driven by a motor M, to which pluralities of pattern rolls 13 are fixed, (d) a first moving mechanism for moving the shaft 15 in a direction to the hard roll 11, (e) pressure rolls 21 each pushing each of the pattern rolls 13 from behind, and (f) a second moving mechanism for moving the pressure rolls 21 in a direction to the pattern rolls 13, whereby with the pressure rolls 21 pushing the pattern rolls 13 by the second moving mechanism, the stamp means 13a of the pattern rolls 13 are pressed onto the plastic film 1 by the first moving mechanism, so that the slant, linear easy-to-tear portions 100 with recesses formed by the pattern projections of the stamp means 13a are provided partially and periodically on the plastic film 1.

The first moving mechanism preferably comprises a pair of first carriers 17, 17 rotatably supporting the shaft 15, and a pair of first guide rails 19, 19 extending perpendicularly to the axis of the hard roll 11, along which the first carriers 17, 17 are movable in a direction to the hard roll 11. The first carriers 17 and the first guide rails 19 may have known structures.

Each second moving mechanism preferably comprises a second carrier 22 rotatably supporting each pressure roll 21, and a second guide rail 25 extending perpendicularly to the axis of the hard roll 11, along which the second carrier 22 is movable in a direction to the hard roll 11. The second carriers 22 and the second guide rails 25 may have known structures.

The hard roll 11 supporting the plastic film 1 while forming the easy-to-tear portions 100 is preferably a metal roll, though its material is not restricted as long as its surface is sufficiently hard. To control the moving speed of the plastic film 1, another hard roll 12 is preferably arranged opposite to the hard roll 11, such that a pair of hard rolls 11, 12 can grip the plastic film 1. The hard roll 11 is driven by a motor (not shown), and the surface-smooth roll 12 opposing the hard roll 11 is preferably a follower roll rotating by the movement of the plastic film 1. Because the plastic film 1 is gripped by a pair of hard rolls 11, 12, it is under sufficient tension while the easy-to-tear portions 100 are formed on the plastic film 1 on a surface of the hard roll 11.

Figure 5:
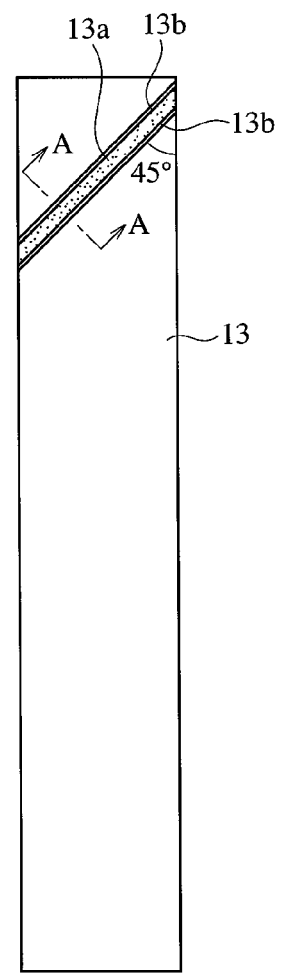
FIG. 5 is a developed view showing a rolling surface of the pattern roll shown in FIG. 4.
Figure 7:
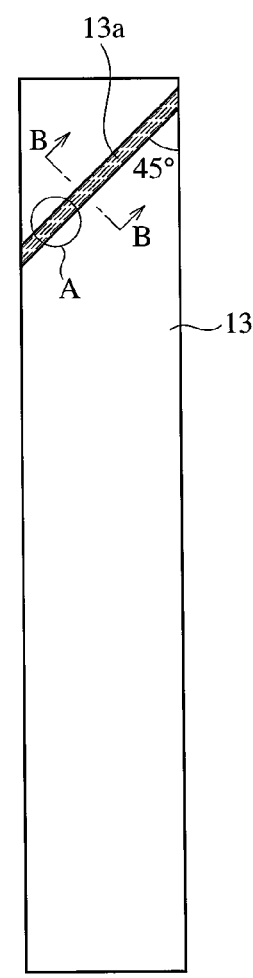
FIG. 7 is a developed view showing a rolling surface of another example of pattern rolls used in the first and second apparatuses for forming easy-to-tear portions.
Figure 8:
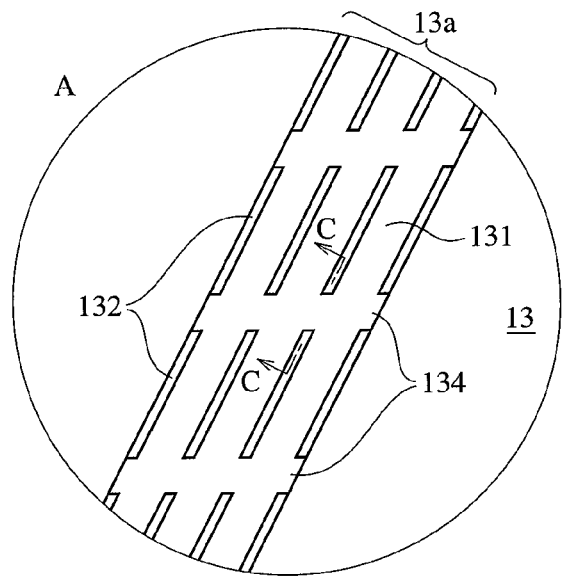
FIG. 8 is an enlarged view showing a portion A in FIG. 7.
Figure 9:
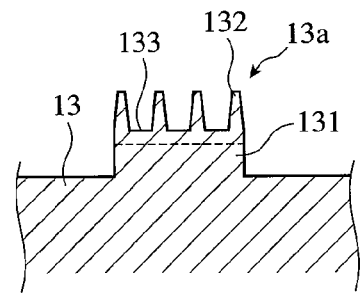
FIG. 9 is an enlarged cross-sectional view taken along the line B-B in FIG. 7.
Figure 10:
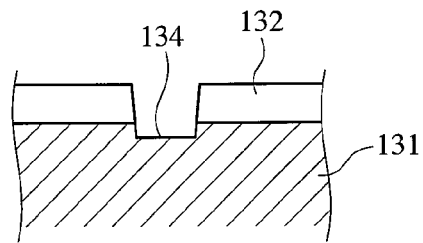
FIG. 10 is an enlarged cross-sectional view taken along the line C-C in FIG. 8.

As shown in FIG. 2, pluralities of pattern rolls 13 for forming a large number of recesses constituting the easy-to-tear portions 100 on the plastic film 1 are fixed to one shaft 15 with predetermined intervals. Each pattern roll 13 is preferably a metal roll having one slant, linear stamp means 13a on a rolling surface. As shown in FIGS. 5 and 7, the stamp means 13a extends on the rolling surface of the pattern roll 13 slantly (for instance, at 45°) to the axis of the pattern roll 13.

Figure 4:
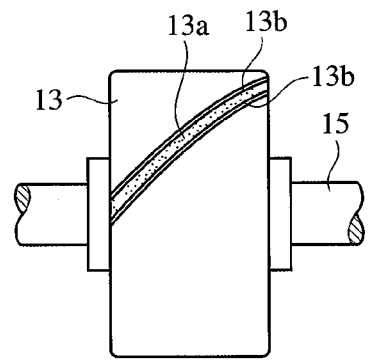
FIG. 4 is a front view showing one example of pattern rolls used in the first and second apparatuses for forming easy-to-tear portions.
Figure 6:
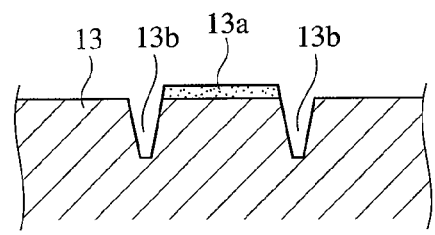
FIG. 6 is an enlarged cross-sectional view taken along the line A-A in FIG. 5.

As shown in FIGS. 4-6, the first example of the stamp means 13a comprises projections constituted by a large number of hard particles having sharp corners and Mohs' hardness of 5 or more. Grooves 13b, 13b are formed on both sides of the stamp means 13a. The grooves 13b, 13b on both sides form sharp edges of the stamp means 13a, providing the easy-to-tear portions 100 with sharp edges. The hard particles are preferably fine diamond particles, which are attached to a metal roll surface with a nickel plating, etc. The average particle size of hard particles is determined depending on the thickness and layer structure of the plastic film 1. For instance, when the plastic film 1 is a laminate constituted by a 15-μm-thick polyethylene terephthalate (PET) layer, a 20-μm-thick nylon layer, an aluminum foil, and a 40-μm-thick polyethylene (sealant) layer, the PET layer and the nylon layer should be sufficiently cut. Accordingly, the average particle size of hard particles is preferably in a range from 30 μm to 200 μm, such that recesses can be formed to the depth near 15 μm+20 μm=35 μm. The percentage (area ratio) of hard particles on the surface of the stamp means 13a is generally 10-50%, preferably 15-30%.

As shown in FIGS. 7-10, the second example of the stamp means 13a comprises a ridge 131 formed slantly on the rolling surface, and pluralities of parallel edges 132 projecting from an upper surface of the ridge 131. To make the edges 132 easily bite the plastic film 1, the edges 132 may be provided with notches 134 periodically. The edges 132 of the stamp means 13a are obtained by cutting a rolling surface of the metal roll to form the ridge 131, and then forming pluralities of parallel grooves 133 on the upper surface of the ridge 131 by a grinder. The edges 132 are high enough to cut the plastic film 1 as deep as preferably about 35 μm in the above example. Specifically, the height of the edges 132 is preferably about 100-300 μm. In order that the edges 132 have sufficient strength and hardness, a metal roll having the stamp means 13a is preferably made of high-speed steel, tool steel, cemented carbides, etc. Though plural lines of edges 132 are arranged in the depicted example, the apparatus of the present invention is not restricted thereto, but may have a line of edges 132. Though the stamp means 13a having the ridge 131 with edges 132 is integral with each pattern roll 13 in the depicted example, they may be separate members. In this case, the stamp means 13a is preferably made of high-speed steel, tool steel, cemented carbide, etc., and a roll body is preferably made of stainless steel.

Figure 14:
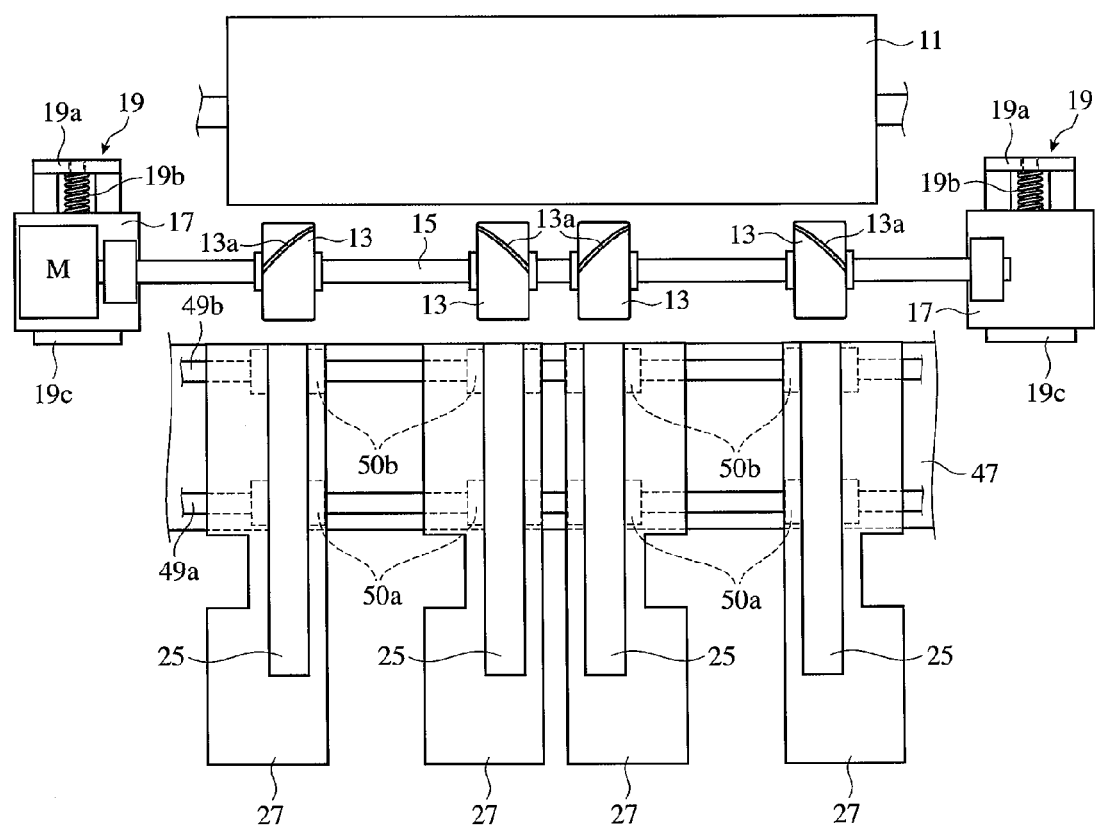
FIG. 14 is a plan view showing the arrangement of a hard roll, pattern rolls, carriers, tables and guide rails, which constitute the first apparatus for forming easy-to-tear portions.

As is clear from FIGS. 2 and 14, both ends of the shaft 15, to which pluralities of pattern rolls 13 are fixed, are rotatably supported by a pair of first carriers 17, 17, a motor M being mounted to one end of the shaft 15. Each first carrier 17, 17 is movable along each first guide rail 19, 19 in a direction perpendicular to the axis of the hard roll 11. A tip end (on the side of the hard roll 11) of each first guide rail 19, 19 is provided with a stopper 19a, 19a and a coil spring 19b, 19b fixed to the stopper 19a, 19a. Accordingly, while the pressure rolls 21 do not push the pattern rolls 13, the first carriers 17, 17 retreat to positions determined by stoppers 19c, 19c provided on the rear ends of the first guide rails 19, 19, such that the pattern rolls 13 are sufficiently separate from the hard roll 11. Further, there is preferably a gap between the pressure rolls 21 and the pattern rolls 13.

Because the transverse positions of the pattern rolls 13 should be set depending on the size of packages (bags) to be produced and the positions of easy-to-tear portions 100, they should be adjustable along the shaft 15. In addition, to control the depth of easy-to-tear portions 100 precisely, the pattern rolls 13 should be positioned with precise gap relative to the hard roll 11. To this end, the pattern rolls 13 should rotate coaxially with the shaft 15 perfectly. Accordingly, the pattern rolls 13 are preferably shrink-fit or screwed to the shaft 15.

Figure 11:
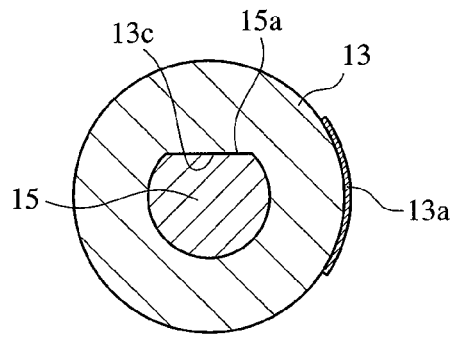
FIG. 11 is a cross-sectional view showing one example of the fixing methods of pattern rolls to a shaft.

When the pattern rolls 13 are shrink-fit to the shaft 15, as shown in FIG. 11, a shaft 15 having a flat surface 15a and pattern rolls 13 each having in its inner surface a flat surface 13c corresponding to the flat surface 15a are combined. In all pattern rolls 13, the positions (rotation positions) of the stamp means 13a relative to the flat surfaces 13c are the same. With the flat surface 15a of the shaft 15 engaging the inner flat surfaces 13c of the pattern rolls 13, the stamp means 13a of all pattern rolls 13 are located at the same rotational position. Thus, pluralities of easy-to-tear portions 100 formed by one rotation of pluralities of pattern rolls 13 are aligned in a transverse direction of the plastic film 1.

Figure 12A:
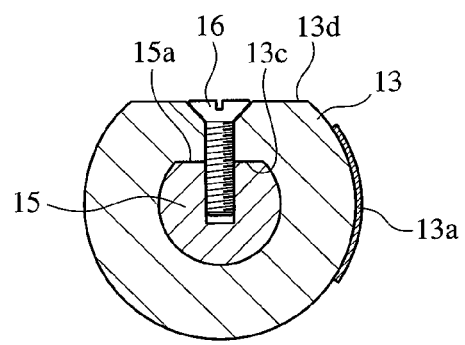
FIG. 12(a) is a cross-sectional view showing another example of the fixing methods of pattern rolls to a shaft.
Figure 12B:
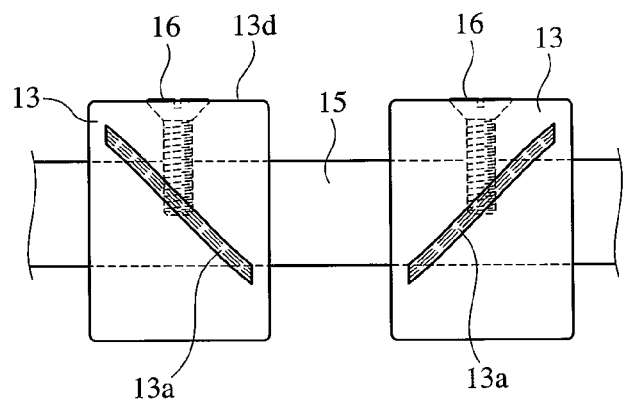
FIG. 12(b) is a partial front view showing the arrangement of pattern rolls fixed to a shaft by the method shown in FIG. 12(a).

FIGS. 12(a) and 12(b) show one example of pattern rolls 13 screwed to a shaft 15. This example uses (a) a shaft 15 having a flat surface 15a with a threaded hole, (b) pattern rolls 13 each having a flat surface 13c corresponding to the flat surface 15a in its inner surface, a flat surface 13d in parallel to the flat surface 13c in its outer surface, and a threaded hole penetrating from the flat surface 13c to the flat surface 13d, and (c) a screw 16 threadably engaging each threaded hole of the shaft 15 and the threaded hole of each pattern roll 13. In all pattern rolls 13, the positions (rotation positions) of the stamp means 13a relative to the flat surfaces 13c (13d) are the same. With the flat surface 15a of the shaft 15 engaging the inner flat surfaces 13c of the pattern rolls 13, and the screws 16 threadably engaging the threaded holes of the shaft 15 and the threaded holes of the pattern rolls 13, the stamp means 13a of all pattern rolls 13 are located at the same rotational position. Thus, pluralities of easy-to-tear portions 100 formed by one rotation of pluralities of pattern rolls 13 are aligned in a transverse direction of the plastic film 1.

As shown in FIGS. 3 and 12(b), adjacent pattern rolls 13, 13 on both sides of a centerline 1a, along which the plastic film 1 is cut, should have stamp means 13a, 13a arranged in a "separated V form." Though the longitudinal length (length along the shaft 15) of the stamp means 13a is less than the longitudinal length of the pattern rolls 13 to secure the fixing of the pattern rolls 13 to the shaft 15 in the depicted example, the stamp means 13a and the pattern rolls 13 may of course have the same longitudinal length.

Figure 13A:
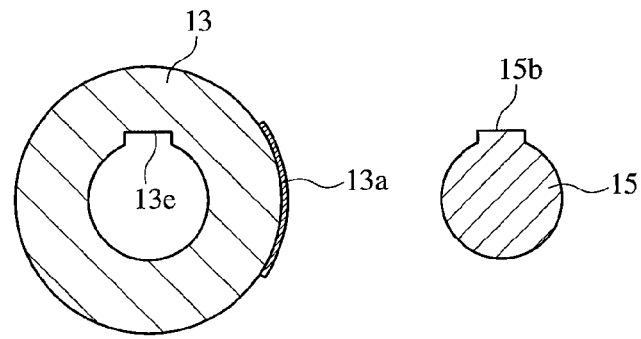
FIG. 13(a) is an exploded cross-sectional view showing a further example of the fixing methods of pattern rolls to a shaft.
Figure 13B:
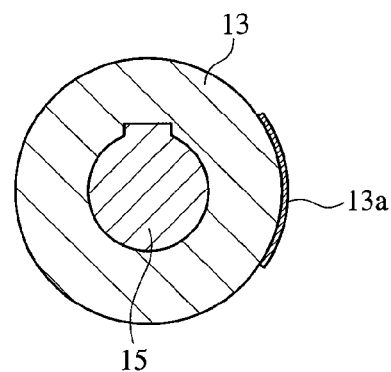
FIG. 13(b) is a cross-sectional view showing a further example of the fixing methods of pattern rolls to a shaft.
Figure 13C:
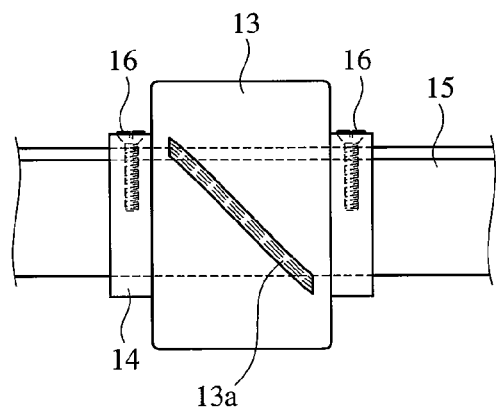
FIG. 13(c) is a front view showing a further example of the fixing methods of pattern rolls to a shaft.

FIGS. 13(a)-13(c) show another example of pattern rolls 13 screwed to a shaft 15. In this example, each pattern roll 13 has an axial notch 13e in its inner surface, while the shaft 15 has an axial ridge 15b to be received in the notch 13e in its outer surface. A combination of the axial notch 13e and the axial ridge 15b acts as a rotation-preventing key. The pattern rolls 13 are provided with flanges 14, 14 on both longitudinal sides. After the shaft 15 is inserted into the pattern rolls 13 with the axial ridge 15b received in the axial notches 13e, the flanges 14, 14 are fixed to the shaft 15 by screws 16, 16.

The pattern rolls 13 are rotated by a motor M mounted to one end of the shaft 15. Thus, the long plastic film 1 passes through a gap between the hard roll 11 and the pattern rolls 13 both driven by motors. Because the easy-to-tear portions 100 should be formed on the plastic film 1 precisely periodically, the peripheral speed of the hard roll 11 (the moving speed of the long plastic film 1) should be precisely equal to the peripheral speed of the pattern rolls 13. To this end, sensors (not shown) for measuring the moving speed of the long plastic film 1 and/or the peripheral speed of the pattern rolls 13 are provided, to control them such that their difference becomes zero.

Though feedback control may be used, more precise control is preferably conducted by setting an initial peripheral speed of the pattern rolls 13 slightly less than the moving speed of the long plastic film 1, and then controlling the moving speed of the plastic film 1 and/or the peripheral speed of the pattern rolls 13 to increase the peripheral speed of the pattern rolls 13 relative to the moving speed of the plastic film 1, such that their difference becomes zero. The initial peripheral speed of the pattern rolls 13 is preferably 95-99% of the moving speed of the long plastic film 1. Such control is conducted because the diameter of each pattern roll 13 inevitably has a dimensional error, which leads to the periodic interval error of easy-to-tear portions 100. For instance, if the pattern rolls 13 were follower rolls, the rotation of the pattern rolls 13 accumulates the above error, so that the periodic intervals of the easy-to-tear portions 100 would undesirably deviate from the predetermined range. To avoid such error, control is conducted to make the difference between the moving speed of the plastic film 1 and the peripheral speed of the pattern rolls 13 zero.

The pressure rolls 21 for pushing the pattern rolls 13 are preferably rubber rolls, to protect the stamp means 13a of the pattern rolls 13, and to increase a friction coefficient between the pressure rolls 21 and the pattern rolls 13. Also, to precisely control the positions and depth of easy-to-tear portions 100 formed on the plastic film 1, the precise position control of the pressure rolls 21 is needed. Accordingly, each second moving mechanism for moving each pressure roll 21 in a direction to the pattern roll 13 comprises a second carrier 22 rotatably supporting each pressure roll 21, and a second guide rail 25 extending perpendicularly to the axis of the hard roll 11, along which the second carrier 22 is movable in a direction to the hard roll 11. As shown in FIG. 14, each second guide rail 25 is fixed to each table 27.

Figure 15:
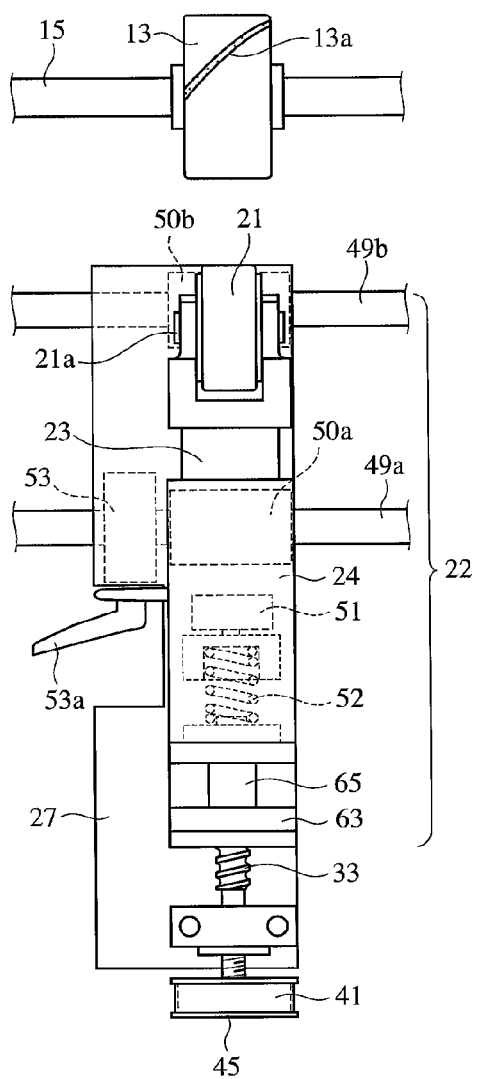
FIG. 15 is an enlarged plan view showing a holder of each pressure roll in the first apparatus for forming easy-to-tear portions.
Figure 16:
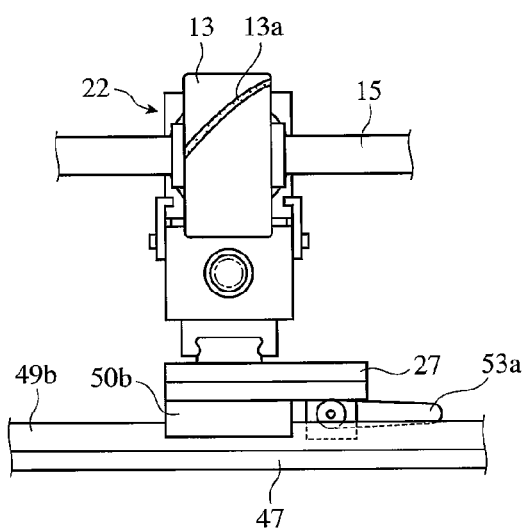
FIG. 16 is an enlarged partial front view showing the first apparatus for forming easy-to-tear portions.

As shown in FIGS. 1, 15 and 16, each second carrier 22 comprises a support member 23 rotatably supporting the pressure roll 21, a holder 24 telescopically receiving the support member 23, a load cell 51 set in the holder 24, and a rod 65 fixed to a vertical frame 63 of the second carrier 22 and supporting the load cell 51 via a coil spring 52. The holder 24 may be provided with a key member (not shown) for preventing the rotation of the support member 23. The support member 23 has a two-pronged tip end portion for rotatably supporting a shaft 21a of the pressure roll 21. A rear end of the support member 23 abuts the load cell 51, which measures a load applied to each pressure roll 21. When a load applied to the pressure roll 21 exceeds a predetermined level, the coil spring 52 is compressed, reducing the pushing force of the pressure roll 21 to the pattern roll 13, thereby preventing damage to the long plastic film 1 and the apparatus.

The second carrier 22 movable along the second guide rail 25 on the table 27 comprises a screw shaft 33 rotatably supported by a vertical frame 31 of the table 27, a nut member 35 threadably engaging the screw shaft 33 for converting the rotation of the screw shaft 33 to a linear motion, a carrier body 37 fixed to the nut member 35, and a guide member 39 provided on a lower surface of the carrier body 37 such that it engages the second guide rail 25 on the table 27. The screw shaft 33 and the nut member 35 constitute a so-called ball screw. Mounted to a rear end of the screw shaft 33 is a pulley 45 connected to a motor 43 via a driving belt 41.

Because the transverse positions of the pattern rolls 13 differ depending on the size of packages (bags) to be produced and the positions of the easy-to-tear portions 100, the transverse positions of the second carriers 22 each rotatably supporting each pressure roll 21 should be adjustable depending on the transverse positions of the pattern rolls 13. Accordingly, as shown in FIGS. 1, 2 and 14, the first apparatus for forming easy-to-tear portions comprises a third moving mechanism under the table 27. The third moving mechanism comprises a pair of third guide rails 49a, 49b disposed on an upper surface of a horizontal frame 47 of the apparatus, and a pair of guide members 51a, 51b engaging the third guide rails 49a, 49b. The table 27 is also provided with a linear clamp 53 engaging the third guide rail 49a for providing the table 27 with a fixed axial position, and the linear clamp 53 comprises a clamp arm 53a. When the clamp arm 53a is rotated after the guide members 51a, 51b are moved to a desired position along the third guide rails 49a, 49b, the linear clamp 53 strongly engages the third guide rail 49a, so that the transverse position of each pressure roll 21 can be set precisely. By the third moving mechanism, the transverse positions of the pattern rolls are adjustable depending on the transverse positions of the pattern rolls. To adjust the vertical position of the table 27, a vertically shifting mechanism may be mounted to the horizontal frame 47.

For instance, when easy-to-tear portions 100 are formed on a long plastic laminate film 1 having a sealant layer by the first apparatus, the pattern rolls 13 are first transversely positioned on the shaft 15 by a shrink-fitting method or a screwing method, according to the intervals of the easy-to-tear portions 100. Because one side of a package (bag) is usually a fold, the easy-to-tear portions 100 are preferably formed near a side opposing the fold. Namely, plural pairs of pattern rolls 13 are fixed to the shaft 15, such that pairs of easy-to-tear portions 100 are arranged preferably in a separated inverse V form on a ribbon 101 for forming a bag as shown in FIG. 3.

Next, a long plastic film 1 is caused to pass through a pair of hard rolls 11, 12 with a sealant layer of the plastic film 1 upward (facing the hard roll 11).

Figure 17A:
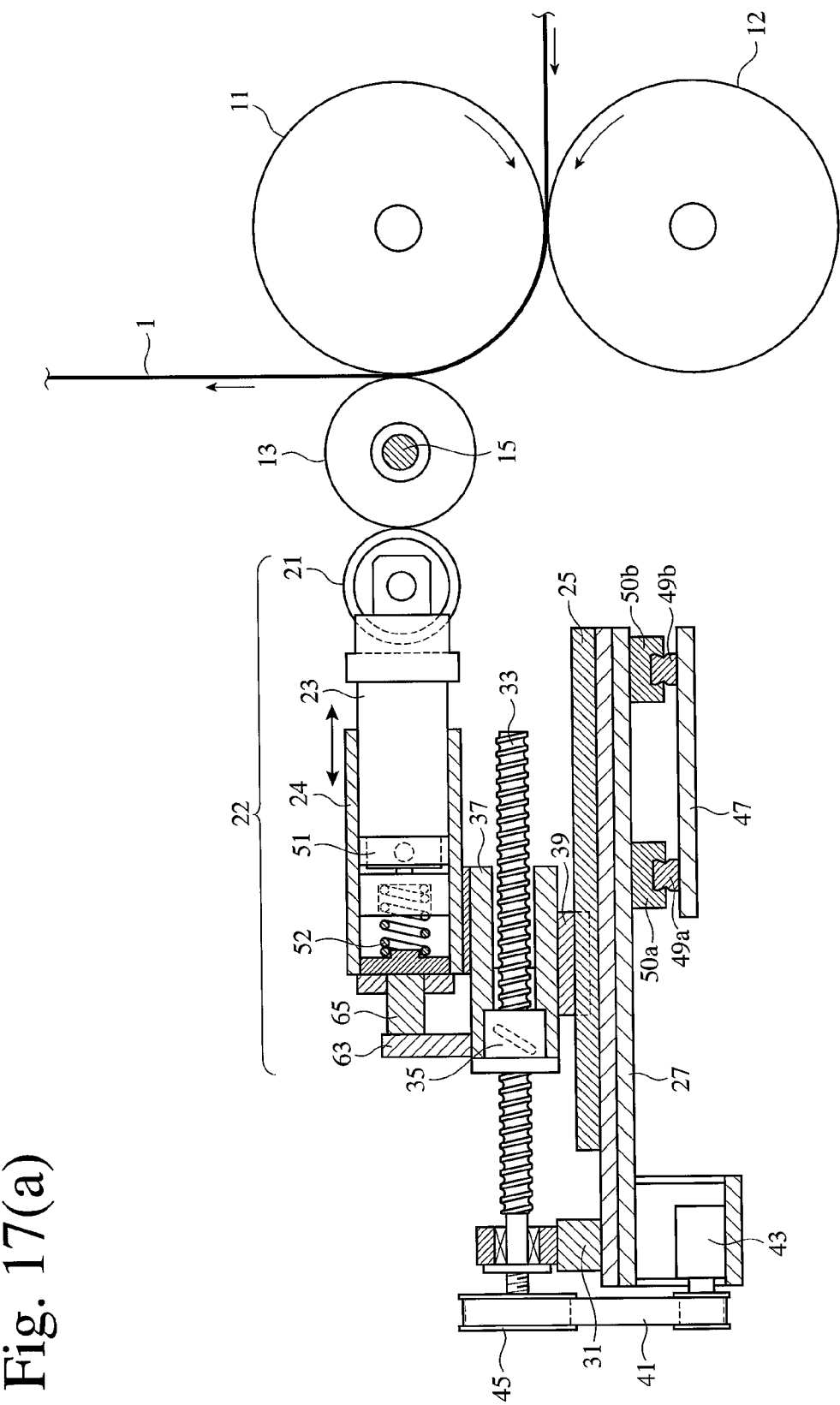
FIG. 17(a) is a partially cross-sectional side view showing the first apparatus for forming easy-to-tear portions, in which pattern rolls are pressed onto a plastic film.
Figure 17B:
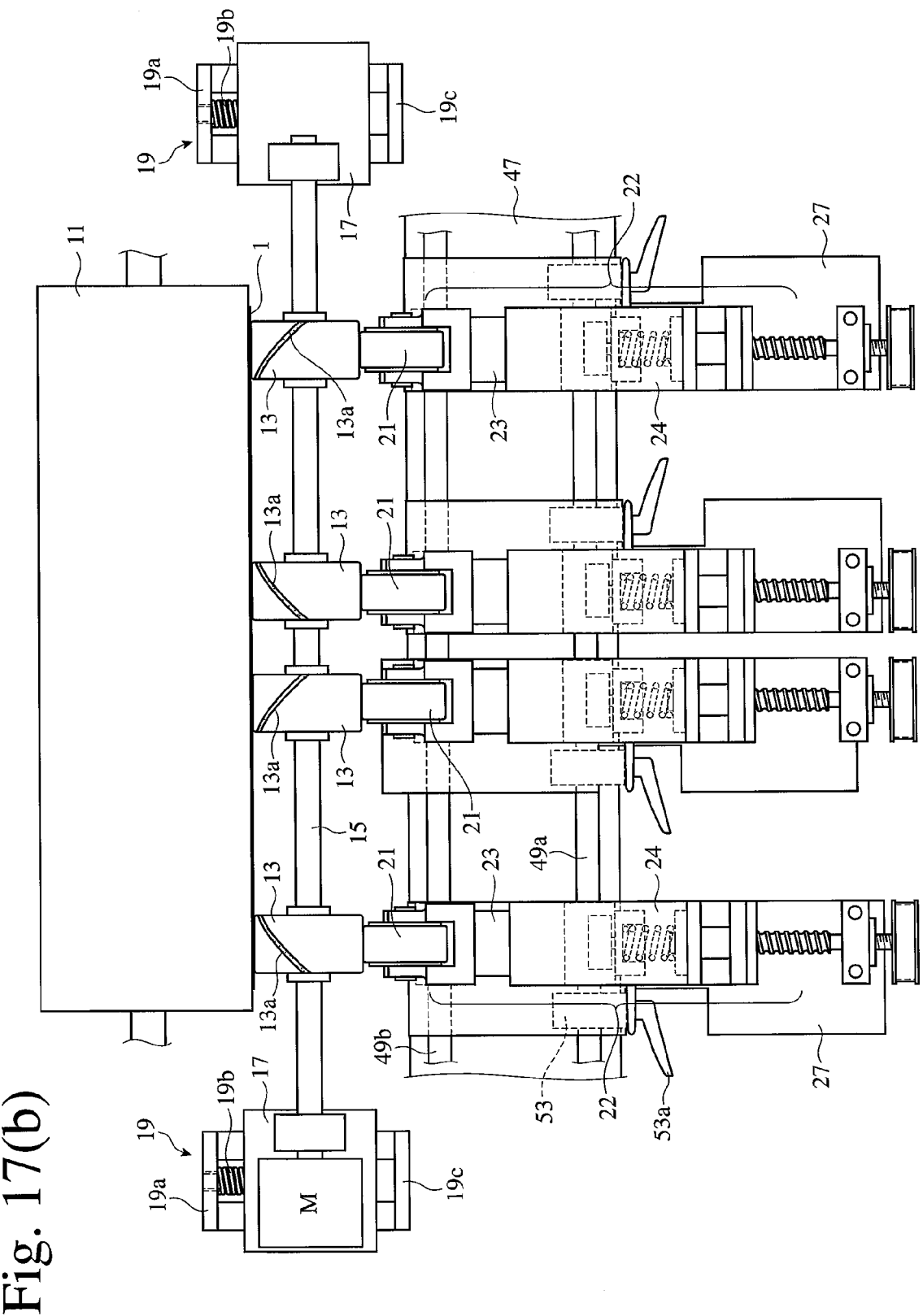
FIG. 17(b) is a plan view showing the first apparatus for forming easy-to-tear portions, in which pattern rolls are pressed onto a plastic film.

Because the pressure rolls 21 do not abut the pattern rolls 13 at their retreated positions as shown in FIG. 2, the first carriers 17, 17 retreat to the stoppers 19c, 19c by the coil springs 19b, 19b. The motor 43 is driven to rotate the screw shaft 33 via a belt 41, moving each pressure roll 21 forward until it comes into contact with each pattern roll 13. By further operation of the motor 43, the pressure rolls 21 push the pattern rolls 13, because the first carriers 17, 17 are movable along the first guide rails 19, 19 in a direction to the hard roll 11. As a result, the stamp means 13a of the pattern rolls 13 are pressed onto the plastic film 1 on the hard roll 11 as shown in FIGS. 17(a) and 17(b).

The average depth of recesses constituting the easy-to-tear portions 100, which are formed on the plastic film 1 by the stamp means 13a of the pattern rolls 13, is determined by pressure applied to the pattern rolls 13 by the pressure rolls 21. Because pressure to the pattern rolls 13 is known from a load applied to the pressure roll 21, the position of each pressure roll 21 is determined according to a signal from the load cell 51. As shown in FIGS. 1 and 17(a), a line connecting the center of each pressure roll 21 to the center of each pattern roll 13 is preferably horizontal. When the long plastic film 1 passes between the hard roll 11 and the pattern rolls 13 in this state, a large number of recesses are formed correspondingly to the pattern projections of the stamp means 13a on the long plastic film 1. Because the stamp means 13a are provided partially and slantly on the rolling surface of each pattern roll 13, the easy-to-tear portions 100 periodically formed by the stamp means 13a are slant to the longitudinal direction of the long plastic film 1 as shown in FIG. 3.

Figure 18:
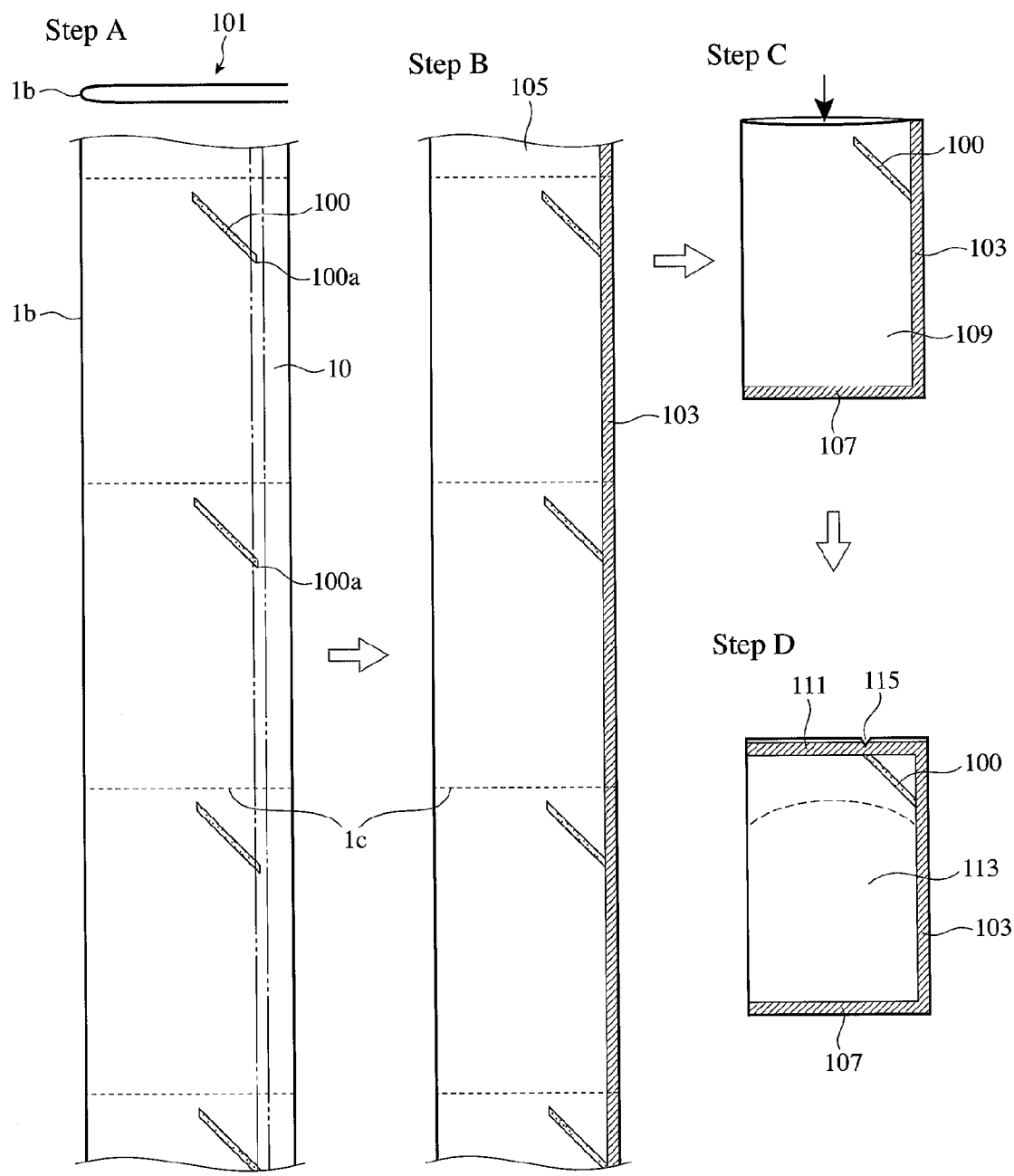
FIG. 18 is a view showing the steps of forming bags from a plastic film having easy-to-tear portions formed by the first and second apparatuses.

Because each pair of pattern rolls 13 have stamp means 13a slant in opposite directions, plural pairs of easy-to-tear portions 100 in a separated inverse V form are formed as shown in FIG. 3. Because lines of two pairs of easy-to-tear portions 100 are formed on a long plastic film 1 in the depicted example, the plastic film 1 is cut to half along a centerline 1a, and each resultant ribbon 101, 101 is folded along a longitudinal line 1b as shown in FIGS. 3 and 18, resulting in the complete overlapping of pairs of easy-to-tear portions 100 (step A). Next, each folded plastic ribbon 101 is longitudinally heat-sealed along a line connecting outer edges 100a of the easy-to-tear portions 100, and a side margin is cut off along the resultant first heat-sealed portion 103, to obtain a flat, tubular ribbon 105 (step B). Further, second heat-sealed portions 107 are formed along transverse lines 1c near the easy-to-tear portions 100, and the tubular ribbon 105 is cut to individual bags 109 (step C). After filling individual bags 109 with a content, their openings are heat-sealed (forming third heat-sealed portions 111), to obtain content-filled bags 113 (step D). The formation of a notch 115 in the third heat-sealed portion 111 near the easy-to-tear portion 100 makes it easy to open the bag 113 along the easy-to-tear portion 100.

[2] Second Apparatus for Forming Easy-to-Tear Portions

Figure 19:
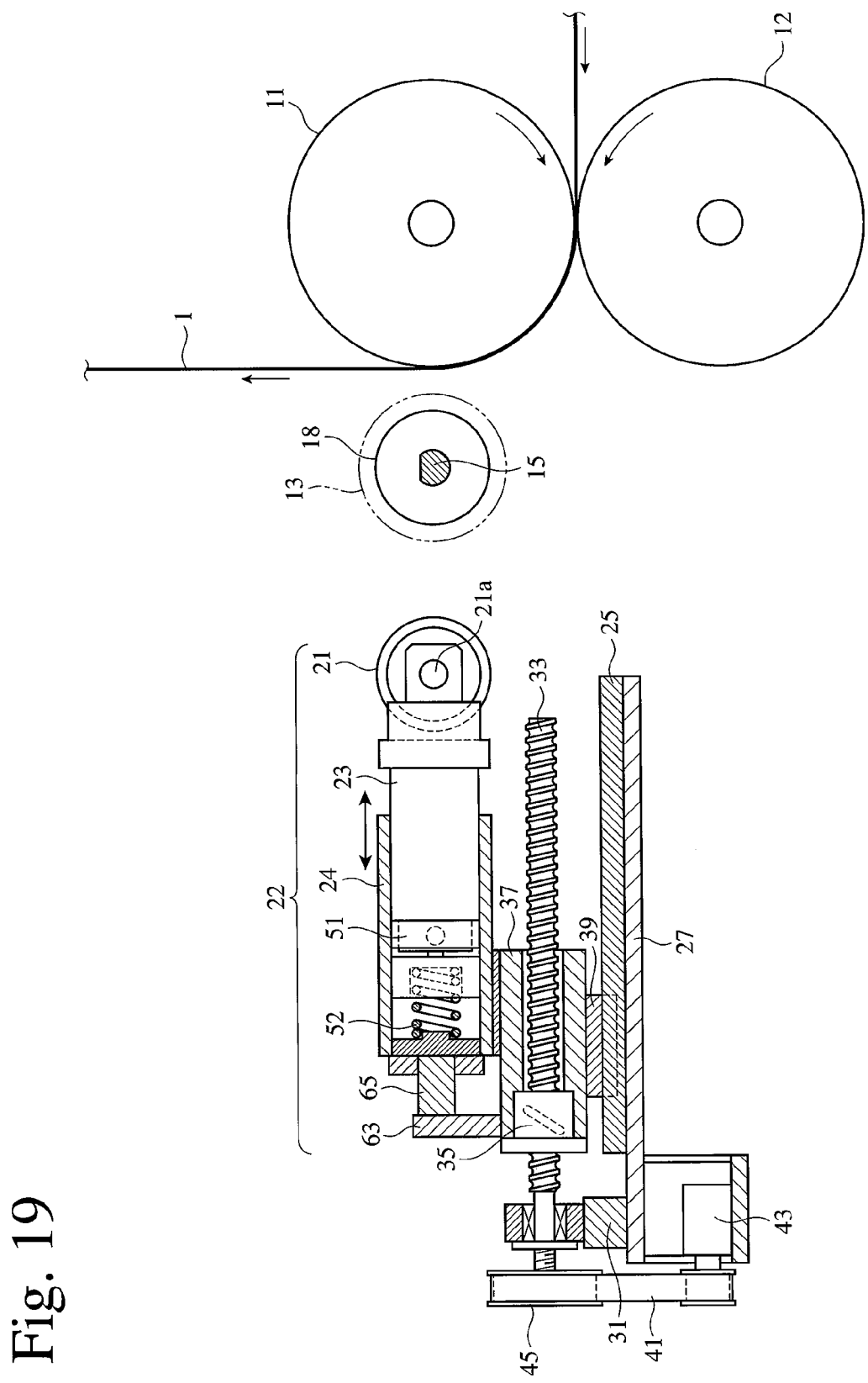
FIG. 19 is a partially cross-sectional side view showing the second apparatus of the present invention for forming easy-to-tear portions.
Figure 20:
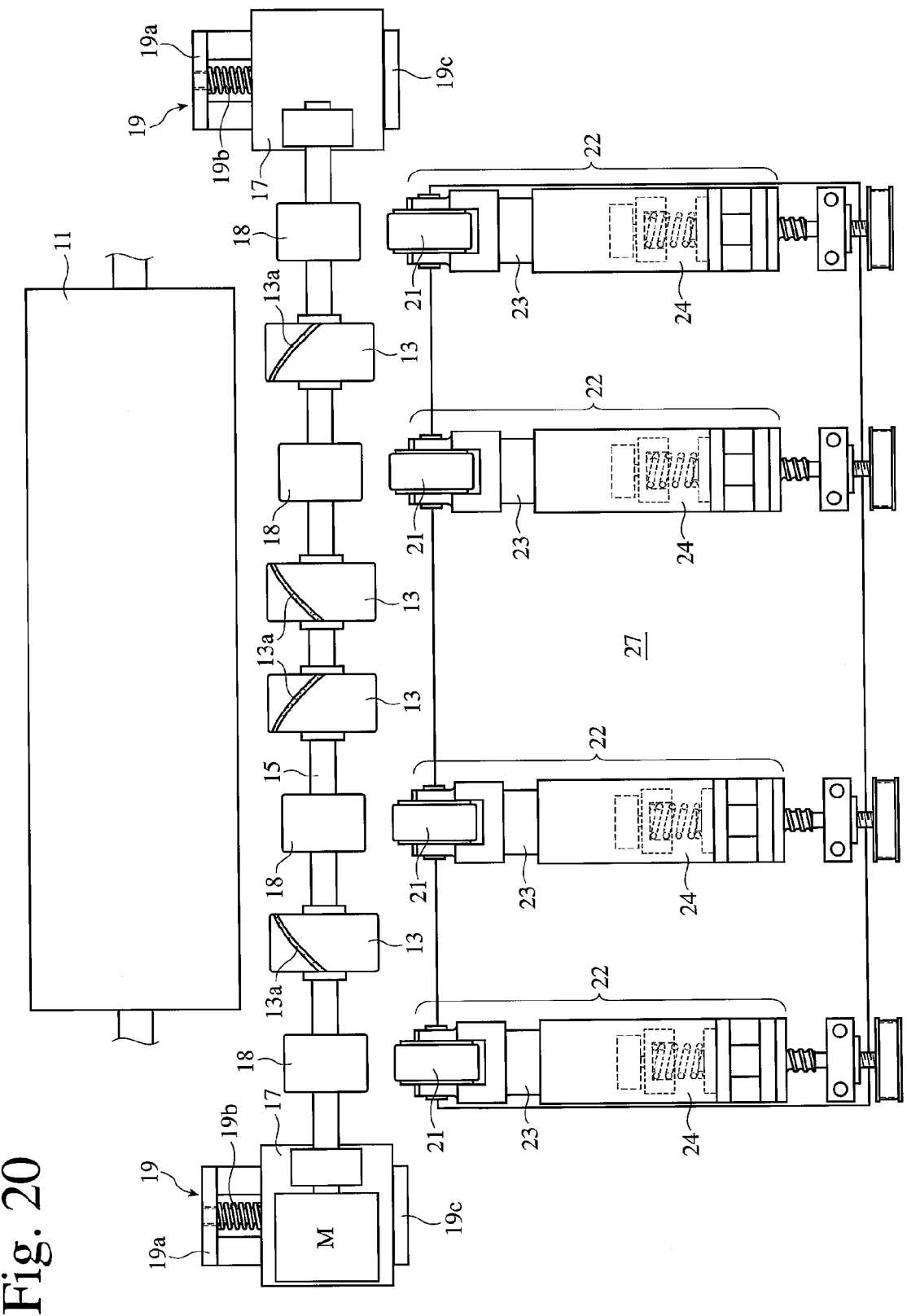
FIG. 20 is a plan view showing the second apparatus for forming easy-to-tear portions.
Figure 21:
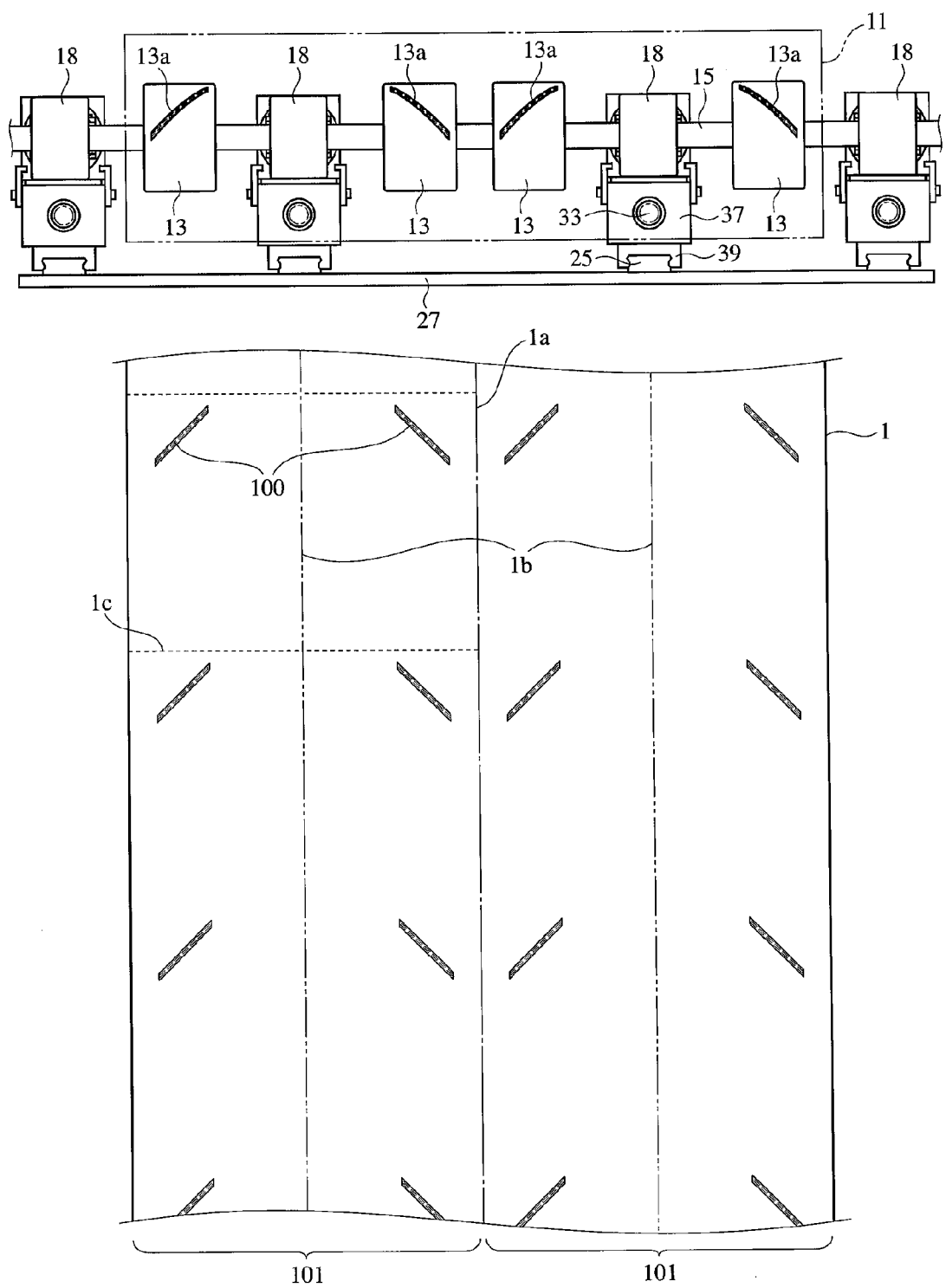
FIG. 21 is a front view showing the second apparatus for forming easy-to-tear portions together with a plastic film on which easy-to-tear portions are formed.

As shown in FIGS. 19-21, the second apparatus of the present invention for forming slant, linear easy-to-tear portions 100 on a long plastic film 1 comprises (a) a hard roll 11 on which a long plastic film 1 passes, (b) pluralities of (4 in the depicted example) pattern rolls 13 each partially having a slant, linear stamp means 13a having pattern projections on a rolling surface, (c) a shaft 15 to which pluralities of pattern rolls 13 are fixed, (d) a first moving mechanism for moving the shaft 15 in a direction to the hard roll 11, (e) pluralities of rolls 18 having smaller diameters than those of the pattern rolls 13, which are fixed to the shaft 15, (f) pressure rolls 21 each pushing each of the small-diameter rolls 18 from behind, and (g) a second moving mechanism for moving the pressure rolls 21 in a direction to the small-diameter rolls 18, whereby with the pressure rolls 21 pushing the small-diameter rolls 18 by the second moving mechanism, the stamp means 13a of the pattern rolls 13 fixed to the shaft 15 are pressed onto the plastic film 1 by the first moving mechanism, so that the slant, linear easy-to-tear portions 100 with recesses formed by the pattern projections of the stamp means 13a are partially and periodically formed on the plastic film 1.

The first moving mechanism preferably comprises a pair of first carriers 17, 17 rotatably supporting the shaft 15, and a pair of first guide rails 19, 19 extending perpendicularly to the axis of the hard roll 11, along which the first carriers 17, 17 are movable in a direction to the hard roll 11. The first carriers 17 and the first guide rails 19 may have known structures.

Each second moving mechanism preferably comprises a second carrier 22 rotatably supporting each pressure roll 21, and a second guide rail 25 extending perpendicularly to the axis of the hard roll 11, along which the second carrier 22 is movable in a direction to the hard roll 11. The second carriers 22 and the second guide rails 25 may have known structures.

With respect to the structures of the hard rolls 11, 12, the pattern rolls 13, the pressure rolls 21 and the second carriers 22, the fixing methods of the pattern rolls to the shaft 15, and the control of the peripheral speed of the hard roll 11 (moving speed of the long plastic film 1) relative to the peripheral speed of the pattern rolls 13, the second apparatus may be the same as the first apparatus.

Figure 22:
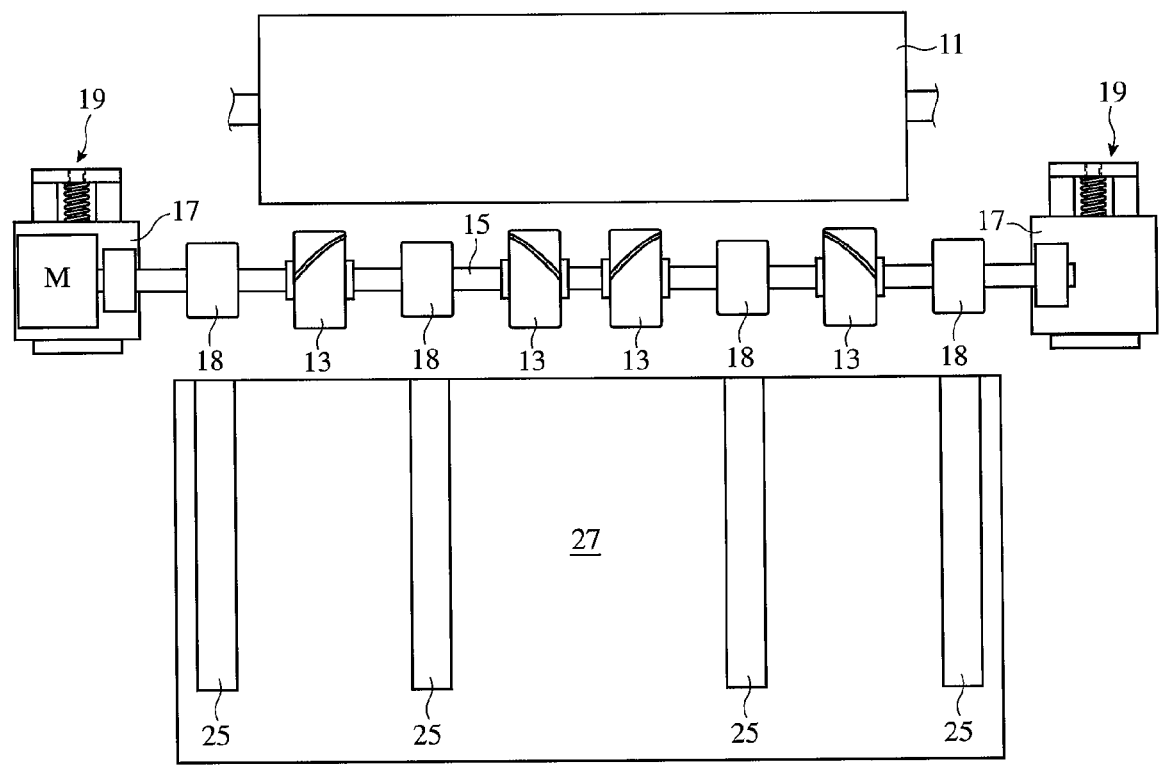
FIG. 22 is a plan view showing the arrangement of a hard roll, pattern rolls, small-diameter rolls, carriers, a table and guide rails, which constitute the second apparatus for forming easy-to-tear portions.
Figure 23:
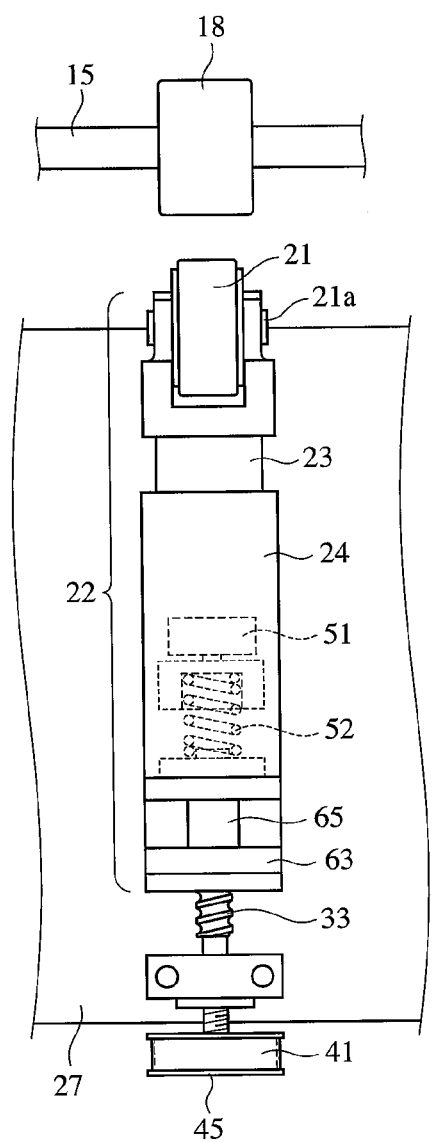
FIG. 23 is an enlarged plan view showing a holder of each pressure roll in the second apparatus for forming easy-to-tear portions.

As is clear from FIGS. 20 and 22, both ends of the shaft 15, to which pluralities of pattern rolls 13 are fixed, are rotatably supported by a pair of first carriers 17, 17, a motor M being mounted to one end of the shaft 15. Each first carrier 17, 17 is movable along each first guide rail 19, 19 in a direction perpendicular to the axis of the hard roll 11. With respect to the structures of the first guide rails 19, 19, the second apparatus may be the same as the first apparatus. While the pressure rolls 21 do not push the pattern rolls 13, the first carriers 17, 17 retreat to positions determined by stoppers 19c, 19c provided on the rear ends of the first guide rails 19, 19, such that the pattern rolls 13 are sufficiently separate from the hard roll 11. Further, there is preferably a gap between the pressure rolls 21 and the small-diameter rolls 18.

To precisely control the positions and depth of easy-to-tear portions 100 formed on the plastic film 1, the precise position control of the pressure rolls 21 is needed. Accordingly, each second moving mechanism for moving each pressure roll 21 in a direction to the small-diameter roll 18 comprises a second carrier 22 rotatably supporting each pressure roll 21, and a second guide rail 25 extending perpendicularly to the axis of the hard roll 11, along which the second carrier 22 is movable in a direction to the hard roll 11. As shown in FIG. 14, each second guide rail 25 is fixed to each table 27.

For instance, when easy-to-tear portions 100 are formed on a long plastic laminate film 1 having a sealant layer by the second apparatus, the pattern rolls 13 are first transversely positioned on the shaft 15 by a shrink-fitting method or a screwing method, according to the intervals of the easy-to-tear portions 100. Because one side of a package (bag) is usually a fold, the easy-to-tear portions 100 are preferably formed near a side opposing the fold. Namely, plural pairs of pattern rolls 13 are fixed to the shaft 15, such that pairs of easy-to-tear portions 100 are arranged preferably in a separated inverse V form on a ribbon 101 for forming a bag as shown in FIG. 21.

Next, a long plastic film 1 is caused to pass through a pair of hard rolls 11, 12 with a sealant layer of the plastic film 1 upward (facing the hard roll 11).

Figure 24A:
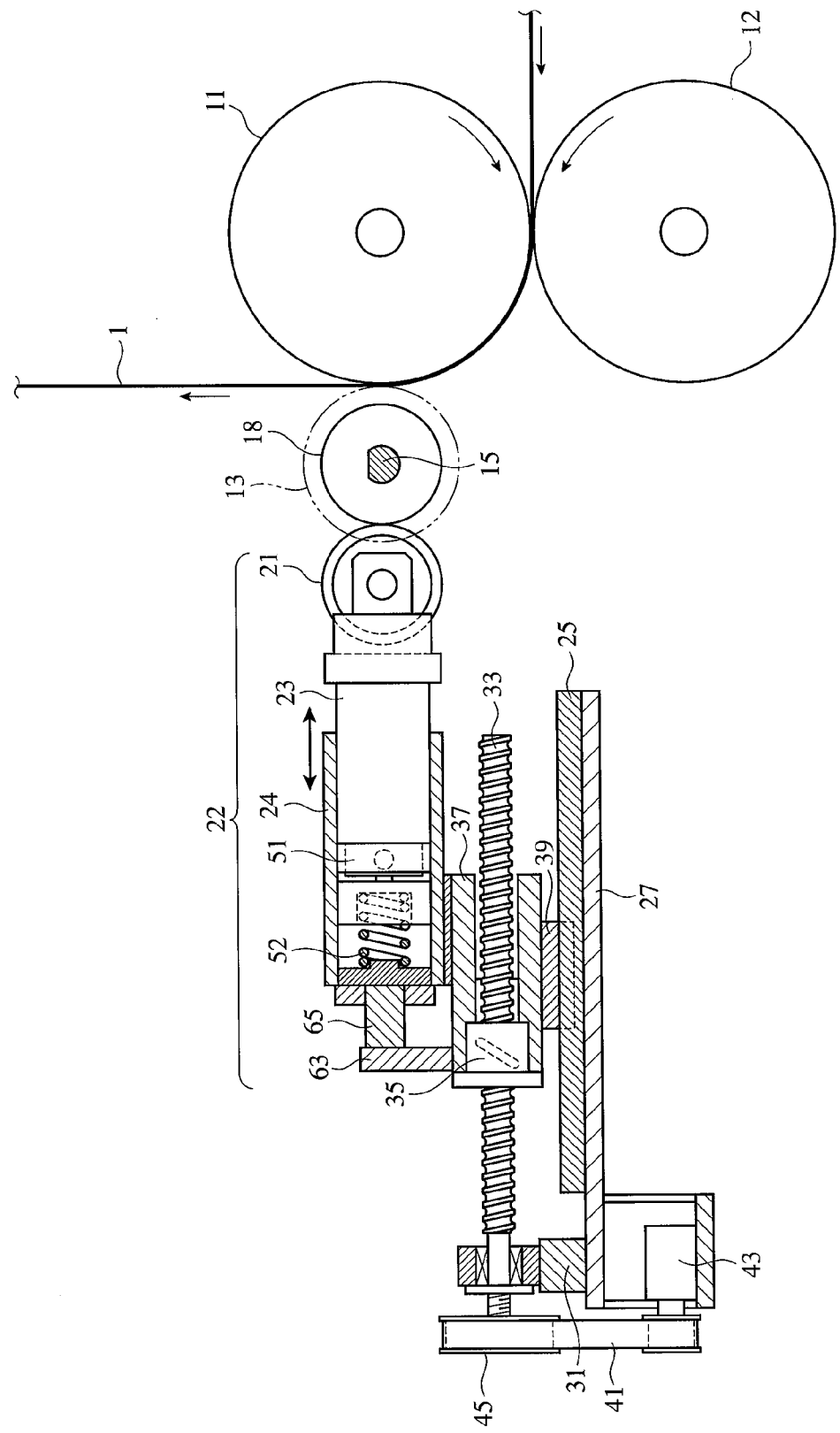
FIG. 24(a) is a partially cross-sectional side view showing the second apparatus for forming easy-to-tear portions, in which pattern rolls are pressed onto a plastic film.
Figure 24B:
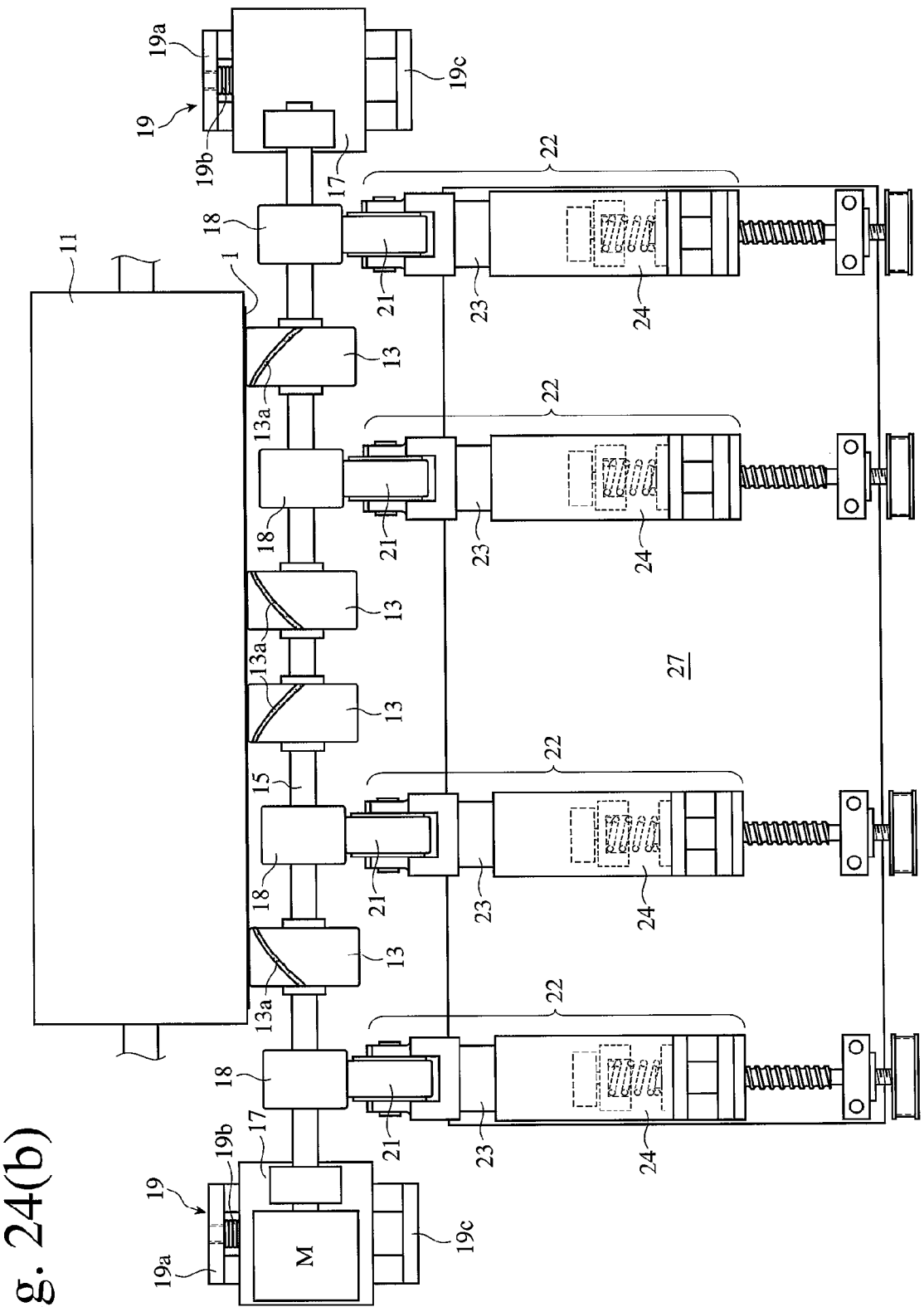
FIG. 24(b) is a plan view showing the second apparatus for forming easy-to-tear portions, in which pattern rolls are pressed onto a plastic film.

Because the pressure rolls 21 do not abut the pattern rolls 13 at their retreated positions as shown in FIG. 20, the first carriers 17, 17 retreat to the stoppers 19c, 19c by the coil springs 19b, 19b. The motor 43 is driven to rotate the screw shaft 33 via a belt 41, moving each pressure roll 21 forward until it comes into contact with each small-diameter roll 18. By further operation of the motor 43, the pressure rolls 21 push the small-diameter rolls 18, because the first carriers 17, 17 are movable along the first guide rails 19, 19 in a direction to the hard roll 11. As a result, the stamp means 13a of the pattern rolls 13 are pressed onto the plastic film 1 on the hard roll 11 as shown in FIGS. 24(a) and 24(b).

The average depth of recesses constituting the easy-to-tear portions 100, which are formed on the plastic film 1 by the stamp means 13a of the pattern rolls 13, is determined by pressure applied to the small-diameter rolls 18 by the pressure rolls 21. Because pressure to the small-diameter roll 18 is known from a load applied to the pressure roll 21, the position of each pressure roll 21 is determined according to a signal from the load cell 51. As shown in FIGS. 19 and 24(a), a line connecting the center of each pressure roll 21 to the center of each small-diameter roll 18 is preferably horizontal. When the long plastic film 1 passes between the hard roll 11 and the pattern rolls 13 in this state, a large number of recesses are formed correspondingly to the pattern projections of the stamp means 13a on the long plastic film 1. Because the stamp means 13a are provided partially and slantly on the rolling surface of each pattern roll 13, the easy-to-tear portions 100 periodically formed by the stamp means 13a are slant to the longitudinal direction of the long plastic film 1 as shown in FIG. 21.

Because each pair of pattern rolls 13 have stamp means 13a slant in opposite directions, plural pairs of easy-to-tear portions 100 in a separated inverse V form are formed as shown in FIG. 21. Because lines of two pairs of easy-to-tear portions 100 are formed on a long plastic film 1 in the depicted example, the plastic film 1 is cut to half along a centerline 1a, and each resultant ribbon 101, 101 is folded along a longitudinal line 1b as shown in FIGS. 21 and 18, resulting in the complete overlapping of pairs of easy-to-tear portions 100 (step A). Subsequently conducting the same steps B, C and D as in the first apparatus for forming easy-to-tear portions, content-filled bags 113 are obtained. As in the first apparatus, the formation of a notch 115 in the third heat-sealed portion 111 near the easy-to-tear portion 100 makes it easy to open the bag 113 along the easy-to-tear portion 100.

What is claimed is:

1. An apparatus for forming slant, linear easy-to-tear portions on a long plastic film, comprising:
   (a) a roll on which the long plastic film passes;
   (b) pluralities of pattern rolls each partially having a slant, linear stamp means having pattern projections on a rolling surface;
   (c) a shaft to which the pluralities of the pattern rolls are fixed;
   (d) a first moving mechanism for moving said shaft in a direction to said roll, on which the long plastic film passes;
   (e) pressure rolls pushing said pattern rolls directly or indirectly via rolls fixed to said shaft, which have a smaller diameter than that of the pattern rolls; and
   (f) a second moving mechanism for moving said pressure rolls in a direction to said pattern rolls, whereby with said pressure rolls pushing said pattern rolls directly or indirectly by said second moving mechanism, the stamp means of said pattern rolls are pressed onto said plastic film by said first moving mechanism, so that the slant, linear easy-to-tear portions with recesses formed by the pattern projections of said stamp means are provided partially and periodically on said plastic film.

2. The apparatus according to claim 1, wherein the pressure rolls are moved by the second moving mechanism so that each of the pressure rolls pushes a respective one of said pattern rolls to the roll on which the long plastic film passes, and the stamp means of said pattern rolls are pressed onto said plastic film.

3. The apparatus according to claim 1, wherein the pressure rolls are moved by the second moving mechanism so that each of the pressure rolls pushes a respective one of said rolls having a smaller diameter than that of the pattern rolls to the roll on which the long plastic film passes, and the stamp means of said pattern rolls are pressed onto said plastic film.

4. The apparatus according to claim 1, wherein said first moving mechanism comprises first carriers rotatably supporting said shaft, and first guide rails extending perpendicularly to the axis of said roll on which the long plastic film passes, along which said first carriers are movable in a direction to said roll on which the long plastic film passes.

5. The apparatus according to claim 4, wherein said first carriers are always pushed by a resilient member with a force in a direction away from said roll on which the long plastic film passes, and wherein said pattern rolls are pushed by said pressure rolls onto said plastic film against the force of said resilient member.

6. The apparatus according to claim 1, wherein said second moving mechanism comprises a second carrier rotatably supporting each pressure roll, and a second guide rail extending perpendicularly to the axis of said roll on which the long plastic film passes, along which said second carrier is movable in a direction to said roll on which the long plastic film passes.

7. The apparatus according to claim 1, wherein transverse positions of said pattern rolls are adjustable along said shaft.

8. The apparatus according to claim 6, further comprising a table and third guide rails, wherein
   the third guide rails are disposed so that the third guide rails extend in parallel to the axis of said roll on which the long plastic film passes,
   said table is disposed on the third guide rails so that said table is movable along the third guide rails,
   said second guide rail is fixed to said table in a direction perpendicularly to the axis of said roll on which the long plastic film passes, so that transverse positions of said pressure rolls are adjustable depending on transverse positions of said pattern rolls.

9. The apparatus according to claim 6, wherein said second guide rail is located at a fixed position, such that each of said pressure rolls comes into contact with the corresponding roll having a smaller diameter than that of the pattern rolls.

10. The apparatus according to claim 1, wherein the projections of said stamp means comprise a plurality of particles having sharp corners and Mohs' hardness of 5 or more, both sides of said stamp means being defined by grooves on the rolling surface.

11. The apparatus according to claim 1, wherein the projections of said stamp means comprise a ridge slantly extending on said rolling surface, and one or more edges projecting from an upper surface of said ridge in parallel to said ridge, said edges being periodically provided with notches.

\* \* \* \* \*